United States Patent

Evans et al.

[11] Patent Number: 5,771,962
[45] Date of Patent: Jun. 30, 1998

[54] MANUFACTURE OF HEAT EXCHANGER ASSEMBLY BY CAB BRAZING

[75] Inventors: Timothy Van Evans, Ypsilanti; Henry Mehraban, Northville; Matthew John Zaluzec, Canton; Gerry A. Grab, Trenton, all of Mich.

[73] Assignee: Ford Motor Company, Dearborn, Mich.

[21] Appl. No.: 627,871

[22] Filed: Apr. 3, 1996

[51] Int. Cl.$^6$ .................................................. F28F 19/02
[52] U.S. Cl. ...................... 165/133; 29/890.054; 148/23; 228/219; 228/226; 228/183
[58] Field of Search ................................. 165/133, 134.1; 29/890.054; 228/183, 226, 219; 148/23, 24

[56] References Cited

U.S. PATENT DOCUMENTS

| | | |
|---|---|---|
| 2,312,039 | 2/1943 | Hoglund . |
| 3,081,534 | 3/1963 | Bredzs . |
| 3,395,001 | 7/1968 | Stroup et al. . |
| 3,440,712 | 4/1969 | Stroup et al. . |
| 3,782,929 | 1/1974 | Werner . |
| 3,788,824 | 1/1974 | Singleton, Jr. et al. . |
| 3,917,151 | 11/1975 | Robinson . |
| 3,963,454 | 6/1976 | Singleton, Jr. . |
| 4,146,163 | 3/1979 | Anderson et al. . |
| 4,173,302 | 11/1979 | Schultze et al. ........................ 228/219 |
| 4,357,397 | 11/1982 | Baba et al. . |
| 4,489,140 | 12/1984 | Pulliam et al . |
| 4,560,625 | 12/1985 | Kaifu et al. . |
| 4,645,119 | 2/1987 | Haramaki et al. . |
| 4,727,001 | 2/1988 | Takemoto et al. . |
| 4,732,311 | 3/1988 | Hasegawa et al. . |
| 4,758,273 | 7/1988 | Gilman et sal. . |
| 4,852,791 | 8/1989 | Otsuka et al. ....................... 228/226 X |
| 4,901,908 | 2/1990 | Negura et al. ........................... 228/183 |
| 4,988,036 | 1/1991 | Kemble et al. . |
| 5,148,862 | 9/1992 | Hashiura et al. . |
| 5,158,621 | 10/1992 | Das et al. . |
| 5,171,377 | 12/1992 | Shimizu et al. . |
| 5,180,098 | 1/1993 | Halstead et al. . |
| 5,190,596 | 3/1993 | Timsit ...................................... 148/23 |
| 5,232,521 | 8/1993 | Takahashi et al. . |
| 5,350,436 | 9/1994 | Takezoe et al. . |
| 5,398,864 | 3/1995 | Eichhorn et al. ....................... 228/183 |
| 5,422,191 | 6/1995 | Childree . |
| 5,564,619 | 10/1996 | Childree ............................. 228/183 X |

FOREIGN PATENT DOCUMENTS

| | | |
|---|---|---|
| 0 091 231 A1 | 10/1983 | European Pat. Off. . |
| 0 661 130 A1 | 7/1995 | European Pat. Off. . |
| 2 241 513 A | 9/1991 | United Kingdom . |
| 2 289 056 A | 11/1995 | United Kingdom . |

*Primary Examiner*—Ira S. Lazarus
*Assistant Examiner*—Christopher Atkinson
*Attorney, Agent, or Firm*—Lorraine S. Melotik

[57] ABSTRACT

A heat exchanger assembly including at least one aluminum based tube having an internal surface and an external surface, an aluminum based lithium-magnesium composition cladding applied to either one of the internal surface and external surface of the tube, and at least one aluminum based component disposed adjacent the cladding, a modified aluminum brazing flux applied to a joint between the surface and one component. The modified aluminum brazing flux comprises cesium fluoride, lithium fluoride, or both. Preferably, the cladding further comprises cesium. To manufacture the heat exchanger assembly, the tube and component are joined together with flux applied in the area of the joint using a controlled atmosphere brazing (CAB) process.

16 Claims, 1 Drawing Sheet

MANUFACTURE OF HEAT EXCHANGER ASSEMBLY BY CAB BRAZING

Reference is made to two related patent applications titled "Heat Exchanger and Method of Assembly for Automotive Vehicles" (Discl. No. 95-0703 et al) and "Heat Exchanger and Method of Assembly for Automotive Vehicles" (Discl. No. 95-0704 et al.) being concurrently filed with this application.

BACKGROUND OF THE INVENTION

1. Field of the Invention

The present invention relates generally to a heat exchanger for automotive vehicles manufactured by controlled atmosphere brazing ("CAB").

2. Description of the Related Art

It is known to provide automotive vehicles with heat exchangers such as condensers, evaporators, heater cores and coolers generally made of aluminum or aluminum alloys. These heat exchangers are alternating rows of tubes or plates. The heat exchangers often include convoluted fins brazed to the external surfaces of the tubes and turbulators disposed within the tubes and brazed to their inner surfaces. These tubes, fins and turbulators. Previously, the brazing of the fins and turbulators to the tube surfaces has been carried out in a vacuum furnace. Recently, however, a process known as "controlled atmosphere brazing" (CAB) has been employed. CAB furnace brazing is preferred over vacuum furnace brazing due to improved production yields, lower furnace maintenance requirements and greater braze process robustness. When aluminum components are exposed to air, the surface layer oxidizes and forms aluminum oxide. Although heat exchangers are pre-cleaned using alkaline cleaning agents which reduce the native aluminum oxide layer, the surface of the heat exchanger will re-oxidize in the CAB furnace due to the presence of the oxygen and water vapor in the nitrogen gas used in the furnace. In order to braze aluminum components together, a flux is provided at the joint to disrupt any aluminum oxide which might interfere with the formation of a sound joint. A flux commonly used in CAB furnace brazing is NOCOLOK™ (potassium fluoaluminate represented often as "KALF").

Magnesium is commonly included in aluminum based core materials to improve their strength and corrosion resistance. It is also generally included in the aluminum alloy generally clad on the core materials. U.S. Pat. No. 5,422,191 to Childree discloses aluminum cladding materials which include lithium in addition to magnesium to increase the post braze strength of the brazed joint. The patent teaches that for CAB processing, NOCOLOK™ flux can be used. We have found, however, that the use of a standard KALF flux, however, works less than desirably with core and clad materials which contain desirably high levels of magnesium. In these situations, the magnesium melts during processing and flows into the joint area. At these high processing temperatures, magnesium readily forms magnesium oxides which are not broken down by conventional aluminum fluxes such as KALF and hence this oxide and the aluminum oxides present on the aluminum surfaces interfere with the integrity of the brazed joint. They do this by reducing the "wetability" of the molten clad layer and its ability to form an effective braze joint. Additionally, because a conventional KALF flux is not effective in CAB brazing for disrupting the complex MgO and $Al_2O_3$ surface oxide, if and when wetting does occur, the braze joint is discontinuous and does not represent a sound braze joint. The end result is a heat exchanger with porous and weak braze joints.

We have found that this problem can be overcome by our invention which comprises including lithium fluoride, cesium fluoride or their mixture into an aluminum flux like NOCOLOK™. Because the lithium and cesium in the flux have relatively low melting temperatures compared to magnesium, the lithium and cesium will melt first and flow into the joint area before the magnesium forming a sound braze joint. We have found that by including lithium or cesium in the flux, the size of the braze fillet is increased 30 to 100% which significantly increases the braze joint quality and strength.

SUMMARY OF THE INVENTION

Accordingly, the present invention is an automotive vehicle heat exchanger assembly manufactured using controlled atmosphere brazing. The heat exchanger assembly includes at least one aluminum based tube having an internal surface and an external surface, a cladding of an aluminum based lithium-magnesium composition applied to one or both of the internal surface or external surface of the tube, at least one aluminum based component brazed at a joint to the cladding; and a modified aluminum brazing flux carried in the joint, the modified aluminum brazing flux comprising cesium fluoride, lithium fluoride, or their mixture added into an aluminum brazing flux. The at least one tube and the at least one component are brazed during a controlled atmosphere brazing process. The surface of at least one component adjacent the joint may also carry a lithium-magnesium composition cladding. Optionally, the clad material further comprises elemental cesium (Cs) to reduce the MgO during the flowing of the clad during brazing.

Additionally, the present invention is a method for manufacturing the heat exchanger assembly disclosed above. The method includes the steps of: providing at least one tube of an aluminum based material having an internal surface and an external surface; applying an aluminum based lithium-magnesium composition cladding to either one or both of the internal surface or external surface; disposing at least one component adjacent the cladding; applying a modified aluminum brazing flux to a joint between the at least one tube and the at least one component, the modified aluminum brazing flux comprising cesium fluoride and/or lithium fluoride added into an aluminum brazing flux; and joining the tube and component together using a controlled atmosphere brazing process. In this method, the surface of the at least one component adjacent the joint may also carry the lithium-magnesium composition cladding. Preferably, the cladding material further comprises cesium.

Advantageously, according to the present invention, a heat exchanger assembly which has a desired higher level of magnesium in the core materials for improved strength can still be brazed according to a preferred brazing process, i.e., a CAB furnace brazing process. The use of a conventional flux such as NOCOLOK™ flux would not provide a sound joint because during the CAB process the magnesium in the core diffuses out, forming a MgO surface layer and renders NOCOLOK™ flux ineffective in CAB brazing. This impedes the ability of the flux to remove magnesium oxide and aluminum oxide at the surface of the parts to be joined by brazing. We have unexpectedly found, however, that by using a modified aluminum flux material which includes added cesium fluoride and/or lithium fluoride in a conventional flux like NOCOLOK™ brazed joints with strength and integrity are formed during the CAB process. In addition, the inclusion of cesium to the cladding allows for higher levels of magnesium in the core materials, thus providing stronger and more durable heat exchangers assemblies.

DESCRIPTION OF THE PREFERRED EMBODIMENT(S)

Figure 1:
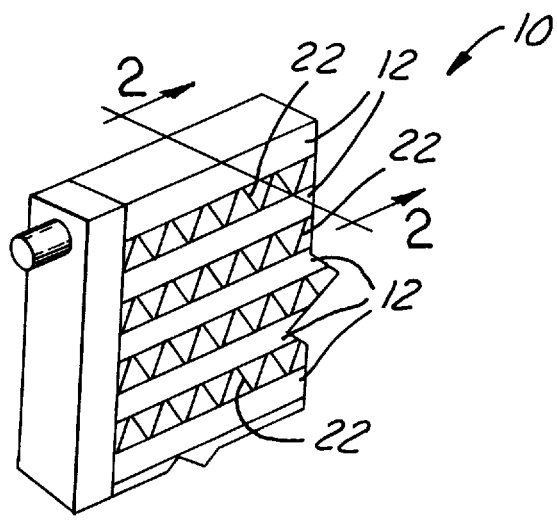
FIG. 1 is a partial perspective view of a heat exchanger assembly according to the present invention.

Referring to FIG. 1, one embodiment of a heat exchanger assembly 10, according to the present invention, is shown. In this example, the heat exchanger assembly 10 is a condenser for an air conditioning system (not shown) of a vehicle such as an automotive vehicle (not shown). It should be appreciated that the heat exchanger assembly 10 may be a parallel flow condenser, serpentine evaporator, heater core, or transmission oil cooler.

Figure 2:
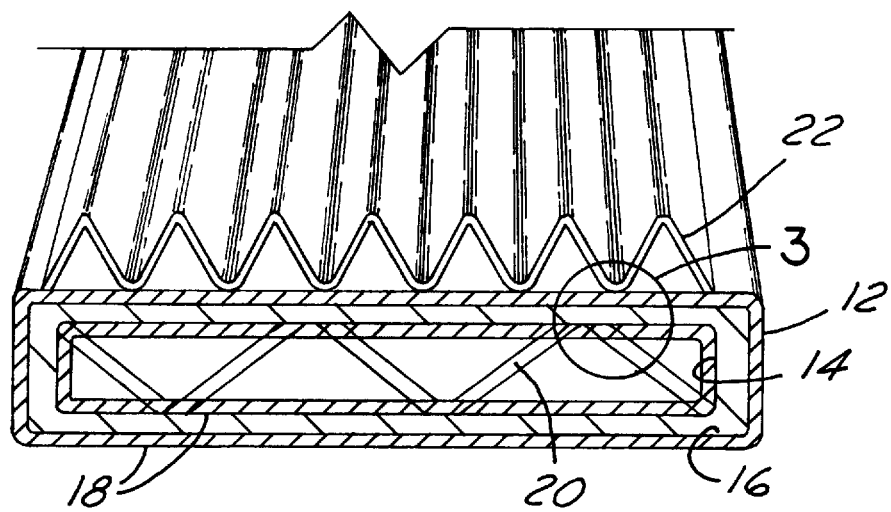
FIG. 2 is a sectional view taken along line 2—2 of FIG. 1.

Referring to FIG. 2, the heat exchanger assembly 10 includes at least one, preferably a plurality of tubes 12 made of aluminum based material. By "aluminum based" with respect to the tube,, cladding, and components like the fins as used in this document is meant that the aluminum based composition comprises mostly aluminum, but may be alloyed with other metals like silicon, copper, magnesium, zinc and so forth. Each tube 12 extends longitudinally and is generally rectangular in shape. The aluminum based core material of tube 12 is preferably selected from the Aluminum Association 1XXX, 3XXX, 5XXX and 6XXX series aluminum alloys. The core aluminum material may and desirably does include magnesium. Preferably, the core material includes magnesium in an amount up to about 3% by weight, more preferably being between about 0.4 and 2.5% by weight.

Each tube 12 has an internal surface 14 and an external surface 16. The internal tube surface 14 and external tube surface 16 each have an aluminum based lithium-magnesium composition cladding 18 thereon. The cladding 18 includes, by weight percent based on the total weight of the composition, lithium (Li) preferably within a range from about 0.01% to about 0.3% and magnesium (Mg) preferably within a range from about 0.1 to 2%, more preferably being 0.2% to about 0.7%. In addition, this cladding preferably may also include, e.g., sodium (Na) within a range from about 0.01% to about 0.1%, silicon (Si) within a range from about 4% to 13%, manganese within a range from about 0 to about 1%, copper within a range from about 0.01% to 0.1%, zinc within a range from about 0 to about 0.3%, beryllium (Be) within a range from about 0.01% to about 0.7%, impurities not exceeding a total of ~1%, the balance being aluminum. It should be appreciated that the composition cladding 18 is made by rolling aluminum sheets of different alloys which is clad to the surfaces 14 and 16 as desired of the tube 12 by methods well known in the art.

Additionally, the composition cladding 18 may contain cesium (Cs) within a range of from about 0 to about 2% by weight based on the weight of the composition cladding. If cesium is included in the cladding 18, lithium will generally be included therein within a range from about 0.2% to about 2.0 weight percent. When cesium is included in the cladding, the magnesium in the core materials may be included in an amount up to about 3%, more preferably in a range between 0.4% and 2.5% by weight, i.e., in a greater amount than when cesium is not included in the cladding. Preferably, the cesium is included in the cladding because it substitutes for cesium fluoride in the flux. During the CAB brazing operation, the cesium in the cladding will diffuse to the surface to reduce MgO—CsO and allow the braze joint to form soundly. The addition of the combination of the lithium and cesium in the cladding provides optimal aluminum oxide and magnesium oxide dissociation in aluminum braze materials.

Figure 3:
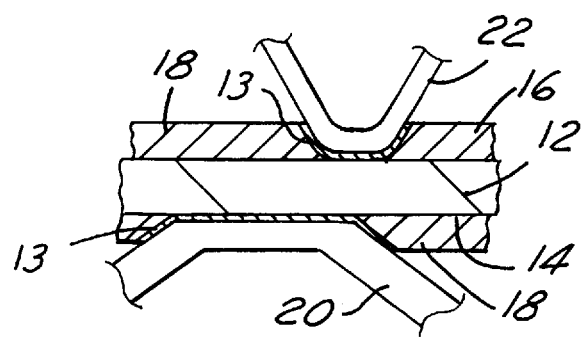
FIG. 3 is an enlarged view of circle 3 in FIG. 2.

Referring to FIGS. 1 through 3, the heat exchanger assembly 10 includes at least one aluminum based component disposed adjacent the cladding 18, which is to be joined by brazing to the tube 12. For example, the heat exchanger assembly 10 may include a turbulator 20 disposed within the tube 12 adjacent the cladding 18 on the internal surface 14. The turbulator 20 extends longitudinally and laterally in a series of undulations. The turbulator 20 breaks up the flow of fluid passing through the tube 12 in use to effect heat transfer. In another example, the heat exchanger assembly 10 includes a fin 22 disposed adjacent the cladding 18 on the external surface 16 of tube 12. The fin 22 extends longitudinally and laterally in a series of undulations. The turbulator 20 and fin 22 are each made of an aluminum based material such as the Aluminum Association 3XXX series aluminum alloys. They may be clad with the magnesium-lithium aluminum based cladding material disclosed above. Generally, however, such cladding is not used on the components 22 and 20.

For manufacture of the heat exchanger assembly 10, the turbulator 20 and fin 22 are joined to the tube 12 using a CAB furnace brazing process. A brazing flux according to the present invention is applied to a joint between the tube 12 and any component to be joined to the tube 12 by brazing, i.e., the turbulator 20 or fin 22. The flux can be applied onto the joint area by any means such as brushing, dipping, and spraying, the latter being preferred because it provide more uniform application.

The modified aluminum brazing flux of the present invention may be formed using a convention aluminum flux such as NOCOLOK™. but critically must include additives added into this flux selected from cesium fluoride, lithium fluoride or their mixture. The modified flux used in the invention preferably includes at least cesium fluoride. This is because cesium melts before lithium and would flow into the joint area readily to dislodge the aluminum oxide and form a sound braze joint. Either of these fluorides or their mixture is preferably included in the modified aluminum flux in an amount of at least 3 weight percent based on the total weight of the flux. More preferably, the cesium fluoride, lithium fluoride or their mixture is present in the modified flux in an amount of 3 to 30%. When a mixture of cesium and lithium fluoride are included in the modified flux, they are optimally present in a ration of from 1:1 to 3:1. It is sometimes advantageous to employ a mixture because this allows to flux to be provided with an optimal flux melting temperature based on the particular mixture. We have found that according to the present invention the area of the braze fillet is increased significantly in size, i.e., from 30 to 100% over that when unmodified NOCOLOK™ is used. Because the lithium and/or cesium modified aluminum fluxes have lower surface tension when melted than the unmodified flux, they wet the joining surfaces well and advantageously form fillets of increased size at the joints. In addition, this modified flux has been found to advantageously disrupt the aluminum oxide layer and aid in the prevention of the formation of magnesium oxide at the joint area. As would be appreciated by those skilled in the art, these advantages will result in stronger brazed joints For manufacture of the heat exchanger assembly 10, the turbulator 20 fin 22 are joined to the tube 12 using a CAB furnace brazing process. During the brazing process, since the aluminum oxide layer has been disrupted and hence made porous by the flux, the Li—Mg (and Cs, if present) in the cladding 18 liquefies at or about 550° C. and flows through the porous aluminum oxide layer present on the external surface 16 to wet the external surface 16. This wetting allows the braze material to flow into a joint to be formed between the tube 12 and other components of the heat exchanger assembly and creates a sound braze joint. The inclusion of the lithium in the clad material acts to prevent the magnesium from migrating out of the core material and hence substantially prevents the formation of undesirable magnesium oxides which interfere with the formation of a sound braze joint. It should also be appreciated that the fins 22 and turbulators 20 as well as plates and manifolds of evaporators (not shown) may have cladding 18.

As would be known to those skilled in the art, the CAB furnace brazing process is conventional and known in the art. In the CAB process, the heat exchanger assembly 10, with flux applied in at least the areas of the to be formed braze joints, is placed on a braze holding furnace fixture 30 and preheated, for example, to a temperature in a range from about 425 to about 474F. The heat exchanger assembly 10 and braze holding furnace fixture 30 are transferred to a prebraze chamber where it is soaked for about 3–15 minutes at about 750F. Subsequently, the hot heat exchanger assembly 10 and braze holding furnace fixture 30 are transferred to a conveyor 32 and moved through a CAB furnace 34 which is purged by applying a nitrogen gas at 34 inside the CAB furnace 36.

In the CAB furnace 36, the heat exchanger assembly 10 is kept for 2–3 minutes at about 1095–1130F. The brazed heat exchanger assembly 10 is then cooled, removed and applied for its intended use.

The present invention has been described in an illustrative manner. Terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A heat exchanger assembly comprising:
   at least one aluminum based tube having an internal surface and an external surface;
   a aluminum based lithium-magnesium composition cladding applied to either one or both of said internal surface and external surface of said tube;
   said composition cladding further including cesium in an amount up to about 2% by weight based on the weight of the cladding; and
   at least one aluminum based component disposed adjacent said cladding;
   a modified aluminum brazing flux applied to a joint between said at least one tube and said at least one component, said modified aluminum brazing flux comprising cesium fluoride, lithium fluoride, or their mixture added into an aluminum brazing flux; whereby the at least one tube and at least one component are joined together during a controlled atmosphere brazing process.

2. The heat exchanger assembly as set forth in claim 1 wherein said modified aluminum brazing flux comprises at least 3 weight percent cesium fluoride, lithium fluoride or their mixture.

3. The heat exchanger assembly as set forth in claim 2 wherein said fluorides are present in said modified aluminum brazing flux in within a range from about 3 to 30 weight percent.

4. The heat exchanger assembly as set forth in claim 3 wherein the ratio of said cesium fluoride to said lithium fluoride in said mixture is a ratio of from 1:1 to 3:1.

5. The heat exchanger assembly as set forth in claim 1 wherein said at least one aluminum based tube comprises material selected from the Aluminum Association 3XXX, 5XXX and 6XXX series aluminum alloys.

6. The heat exchanger assembly as set forth in claim 1 wherein said aluminum based cladding comprises, based on weight percent, lithium (Li) within a range from about 0.01% to about 0.3%, magnesium (Mg) within a range from about 0.2% to about 0.7%, sodium (Na) within a range from about 0.01% to about 0.1%, silicon (Si) within a range from about 4% to 13%, manganese (Mn) within a range from about 0 to about 1%, copper (Cu) within a range from about 0.01% to about 0.1%, zinc (Zn) within a range from 0 to about 0.3%, beryllium (Be) within a range from about 0.01% to about 0.7%, impurities not exceeding a total of 1%, the balance being aluminum.

7. The heat exchanger assembly as set forth in claim 1 wherein said at least one aluminum based component comprises:
   a turbulator disposed within said tube adjacent said cladding on said internal surface, or
   a fin disposed adjacent said cladding on said external surface.

8. The heat exchanger assembly as set forth in claim 1 wherein said at least one aluminum based component comprises material of the Aluminum Association 3XXX series aluminum alloys.

9. The heat exchanger assembly as set forth in claim 1 wherein said magnesium (Mg) in said cladding ranges from about 0.1% to about 2% by weight based on the weight of said cladding.

10. The heat exchanger assembly as set forth in claim 1 wherein said lithium (Li) in said cladding ranges from about 0.01 to about 0.3% by weight based on the weight of said cladding.

11. A method of manufacturing a heat exchanger assembly for an automotive vehicle, said method comprising the steps of:
   providing at least one aluminum based tube having an internal surface and an external surface;
   applying an aluminum based lithium-magnesium composition cladding to either one or both of the internal surface or external surface;
   said composition cladding further including cesium in an amount up to about 2% by weight based on the weight of the cladding;
   disposing at least one aluminum based component adjacent the cladding;
   applying a modified aluminum brazing flux to a joint between the at least one tube and the at least one component, said brazing flux comprising cesium fluoride, lithium fluoride, or their mixture; and
   joining the at least one tube and at least one component together using a controlled atmosphere brazing process.

12. The method for manufacturing a heat exchanger assembly as set forth in claim 11 wherein said fluorides present in said modified aluminum flux are within a range from about 3 to 30 weight percent and based on the total weight of said flux.

13. The method for manufacturing a heat exchanger assembly as set forth in claim 11 wherein said at least one aluminum based tube comprises material selected from the Aluminum Association 3XXX, 5XXX and 6XXX series aluminum alloys.

14. The method for manufacturing a heat exchanger assembly as set forth in claim 11 wherein said aluminum based cladding comprises, based on weight percent, lithium (Li) within a range from about 0.01% to about 0.3%, magnesium (Mg) within a range from about 0.1% to about 2%, sodium (Na) within a range from about 0.01% to about 0.1%, silicon (Si) within a range from about 4% to 13%, manganese (Mn) within a range from about 0 to about 1%, copper (Cu) within a range from about 0.01% to about 0.1%, zinc (Zn) within a range from about 0 to about 0.3%, beryllium (Be) within a range from about 0.01% to about 0.7%, impurities not exceeding a total of 1%, the balance being aluminum.

15. The method for manufacturing a heat exchanger assembly as set forth in claim 11 wherein said at least one aluminum based component comprises:
   a turbulator disposed within said tube adjacent said cladding on said internal surface, or
   a fin disposed adjacent said cladding on said external surface.

16. The method for manufacturing a heat exchanger assembly as set forth in claim 11 wherein said at least one aluminum based component comprises material of the Aluminum Association 3XXX series aluminum alloys.

* * * * *